(12) United States Patent
Zou et al.

(10) Patent No.: US 10,582,179 B2
(45) Date of Patent: Mar. 3, 2020

(54) METHOD AND APPARATUS FOR PROCESSING BINOCULAR DISPARITY IMAGE (71) Applicant: SAMSUNG ELECTRONICS CO., LTD., Suwon-si (KR)

(72) Inventors: Dongqing Zou, Beijing (CN); Ping Guo, Beijing (CN); Qiang Wang, Beijing (CN); Baek Hwan Cho, Seoul (KR); Keun Joo Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 15/338,618

(22) Filed: Oct. 31, 2016

(65) Prior Publication Data

US 2017/0223333 A1    Aug. 3, 2017

(30) Foreign Application Priority Data

Feb. 1, 2016   (CN) .......................... 2016 1 0070550
Aug. 3, 2016   (KR) ........................ 10-2016-0099085

(51) Int. Cl.
*H04N 13/128*    (2018.01)
*H04N 13/106*    (2018.01)
*H04N 13/00*     (2018.01)

(52) U.S. Cl.
CPC ......... *H04N 13/128* (2018.05); *H04N 13/106* (2018.05); *H04N 2013/0081* (2013.01)

(58) Field of Classification Search
CPC ......... H04N 2013/0081; H04N 13/128; H04N 13/293; H04N 13/361
See application file for complete search history.

(56) References Cited

U.S. PATENT DOCUMENTS

| 7,379,583 | B2 | 5/2008 | Zitnick, III et al. |
| 8,712,154 | B2 | 4/2014 | Perbet et al. |
| 8,818,077 | B2 | 8/2014 | Hwang |

(Continued)

FOREIGN PATENT DOCUMENTS

| KR | 101539013 B1 | 7/2015 |
| KR | 101546200 B1 | 8/2015 |

OTHER PUBLICATIONS

Coeurjolly D, Montanvert A. Optimal separable algorithms to compute the reverse euclidean distance transformation and discrete medial axis in arbitrary dimension. IEEE transactions on pattern analysis and machine intelligence. Mar. 2007;29(3). (Year: 2007).*

(Continued)

*Primary Examiner* — Clifford Hilaire
(74) *Attorney, Agent, or Firm* — Sughrue Mion, PLLC (57) ABSTRACT

A method and apparatus for processing a binocular disparity image are provided. A method of determining a disparity of a binocular disparity image that includes a left eye image and a right eye image includes acquiring features of a plurality of pixels of the binocular disparity image based on an event distribution of the binocular disparity image, calculating a cost matrix of matching respective pixels between the left eye image and the right eye image based on the features, and determining a disparity of each matched pair of pixels based on the cost matrix.

14 Claims, 7 Drawing Sheets

(56) References Cited

U.S. PATENT DOCUMENTS

| | | | |
|---|---|---|---|
| 2010/0026825 A1* | 2/2010 | Doida | G06T 3/40 |
| | | | 348/222.1 |
| 2010/0150455 A1* | 6/2010 | Oyama | G01C 3/085 |
| | | | 382/219 |
| 2011/0199462 A1* | 8/2011 | Nanri | G01S 11/12 |
| | | | 348/47 |
| 2013/0083993 A1* | 4/2013 | Sutou | G06T 7/97 |
| | | | 382/154 |
| 2013/0250123 A1 | 9/2013 | Zhang et al. | |
| 2013/0278596 A1 | 10/2013 | Wu et al. | |
| 2014/0043444 A1 | 2/2014 | Haraguchi et al. | |
| 2014/0160247 A1 | 6/2014 | Shi et al. | |
| 2015/0009302 A1 | 1/2015 | Ward et al. | |
| 2015/0077515 A1 | 3/2015 | Lee et al. | |
| 2015/0093041 A1 | 4/2015 | Kang | |
| 2015/0302596 A1 | 10/2015 | Mizukami et al. | |
| 2016/0063719 A1* | 3/2016 | Ukil | G06T 7/97 |
| | | | 382/103 |
| 2017/0124693 A1* | 5/2017 | Ramalingam | G01B 11/14 |

OTHER PUBLICATIONS

Schraml S, Nabil Belbachir A, Bischof H. Event-driven stereo matching for real-time 3D panoramic vision. InProceedings of the IEEE Conference on Computer Vision and Pattern Recognition 2015 (pp. 466-474). (Year: 2015).*

Javed S, Bouwmans T, Jung SK. Depth extended online RPCA with spatiotemporal constraints for robust background subtraction. InFrontiers of Computer Vision (FCV), 2015 21st Korea-Japan Joint Workshop on Jan. 28, 2015 (pp. 1-6). IEEE. (Year: 2015).*

* cited by examiner

//  METHOD AND APPARATUS FOR PROCESSING BINOCULAR DISPARITY IMAGE

CROSS-REFERENCE TO RELATED APPLICATION

This application claims priority from Chinese Patent Application No. 201610070550.X, filed on Feb. 1, 2016 in the State Intellectual Property Office of China, and from Korean Patent Application No. 10-2016-0099085, filed on Aug. 3, 2016 in the Korean Intellectual Property Office, the disclosure of each of which is incorporated herein by reference in its respective entirety.

BACKGROUND

1. Field

Methods and apparatuses consistent with exemplary embodiments relate to processing a binocular disparity image.

2. Description of the Related Art

In association with a technology for processing a binocular disparity image according to the related art, a dynamic vision sensor (DVS) is a type of image sensor that includes a complementary metal-oxide-semiconductor (CMOS). An image acquired by the DVS may generate an event based on an illumination variation. An event portion of the image acquired by the DVS may be determined by comparing the illumination variation to a threshold. However, since the image acquired by the DVS is susceptible to external influences, a relatively large amount of noise may occur in the event portion, and as a result, a distribution of events and a number of the events may not match.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a method for determining a disparity of a binocular disparity image, the method including acquiring a respective feature of each of a plurality of pixels in the binocular disparity image based on an event distribution of the binocular disparity image, the binocular disparity image including a left eye image and a right eye image, calculating a cost matrix of matching respective pixels between the left eye image and the right eye image based on the acquired features, and determining a respective disparity of each matched pair of pixels based on the calculated cost matrix.

The acquiring of the respective feature may include acquiring a distribution of events by classifying the plurality of pixels into pixels included in an event portion and pixels included in a non-event portion, calculating a respective shortest Euclidean distance between each respective one of the pixels in the non-event portion and each respective one of the pixels in the event portion, and setting the calculated respective shortest Euclidean distance as the respective feature for each respective one of the pixels in the non-event portion.

The calculating of the respective shortest Euclidean distance may include acquiring a plurality of parabolas which correspond to a function indicating a respective Euclidean distance between each respective one of the pixels in the non-event portion and each respective one of the pixels in the event portion, acquiring intersections between the acquired parabolas; and calculating the respective shortest Euclidean distance based on a lower envelope of the acquired intersections.

The calculating of the cost matrix may include calculating a respective feature matching cost of each matched pair of pixels based on the at least one feature of the pixels, calculating a respective polar matching cost of each matched pair of pixels based on a respective polarity of each of the pixels, and acquiring the cost matrix based on the calculated feature matching cost and the calculated polar matching cost for each matched pair of pixels.

The determining of the respective disparity may include filtering the cost matrix.

The method may further include removing noise from the binocular disparity image.

The removing of the noise may include acquiring a plurality of feature vectors by applying an orthogonal analysis to the binocular disparity image, calculating at least one respective feature value from each of the plurality of feature vectors, and removing the noise from the binocular disparity image based on the calculated feature values.

The method may further include optimizing each determined respective disparity.

The optimizing of the respective disparity may include acquiring a correlation between the determined disparities, and optimizing each respective disparity based on the acquired correlation.

The acquiring of the correlation may include acquiring a respective robustness value with respect to each respective disparity by applying a cross-validation to the disparities, and acquiring the correlation based on the acquired robustness values.

The optimizing of each respective disparity based on the correlation may include acquiring a dense conditional random field based on the acquired robustness values and the correlation, and optimizing each respective disparity based on the acquired dense conditional random field.

The optimizing of each respective disparity based on the dense conditional random field may include determining a respective sub-pixel level disparity of each matched pair of pixels based on the dense conditional random field, and acquiring a respective depth value of each matched pair of pixels based on the determined respective sub-pixel level disparity and a focal length of a camera that captures the binocular disparity image.

According to another aspect of an exemplary embodiment, there is provided an apparatus for determining a disparity of a binocular disparity image, the apparatus including a feature acquirer configured to acquire a respective feature of each of a plurality of pixels in the binocular disparity image based on an event distribution of the binocular disparity image, the binocular disparity image including a left eye image and a right eye image, a matrix calculator configured to calculate a cost matrix of matching respective pixels between the left eye image and the right eye image based on the acquired features, and a disparity determiner configured to determine a respective disparity of each matched pair of pixels based on the calculated cost matrix.

The apparatus may further include a noise remover configured to remove noise from the binocular disparity image.

The apparatus may further include an optimizer configured to optimize each determined respective disparity.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

Particular structural or functional descriptions of exemplary embodiments are merely intended for the purpose of describing exemplary embodiments and the exemplary embodiments may be implemented in various forms. However, it should be understood that these exemplary embodiments are not construed as limited to the illustrated forms and include all changes, equivalents or alternatives within the technical idea of the present disclosure.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right, according to the concept of the present disclosure.

It should be understood that when a component is referred to as being "connected" or to another component, it can be directly connected or coupled to the other component, or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by persons of ordinary skill in the art. Terms defined in dictionaries generally used should be construed to have meanings matching with contextual meanings in the related art and are not to be construed as an ideal or excessively formal meaning unless otherwise defined herein.

Hereinafter, exemplary embodiments will be described in detail below with reference to the accompanying drawings, and like reference numerals refer to the like elements throughout.

In the following description, an image acquired by a dynamic vision sensor (DVS) may be referred to as a "DVS image." Also, a binocular disparity image may be referred to as a "stereoscopic image."

Figure 1:
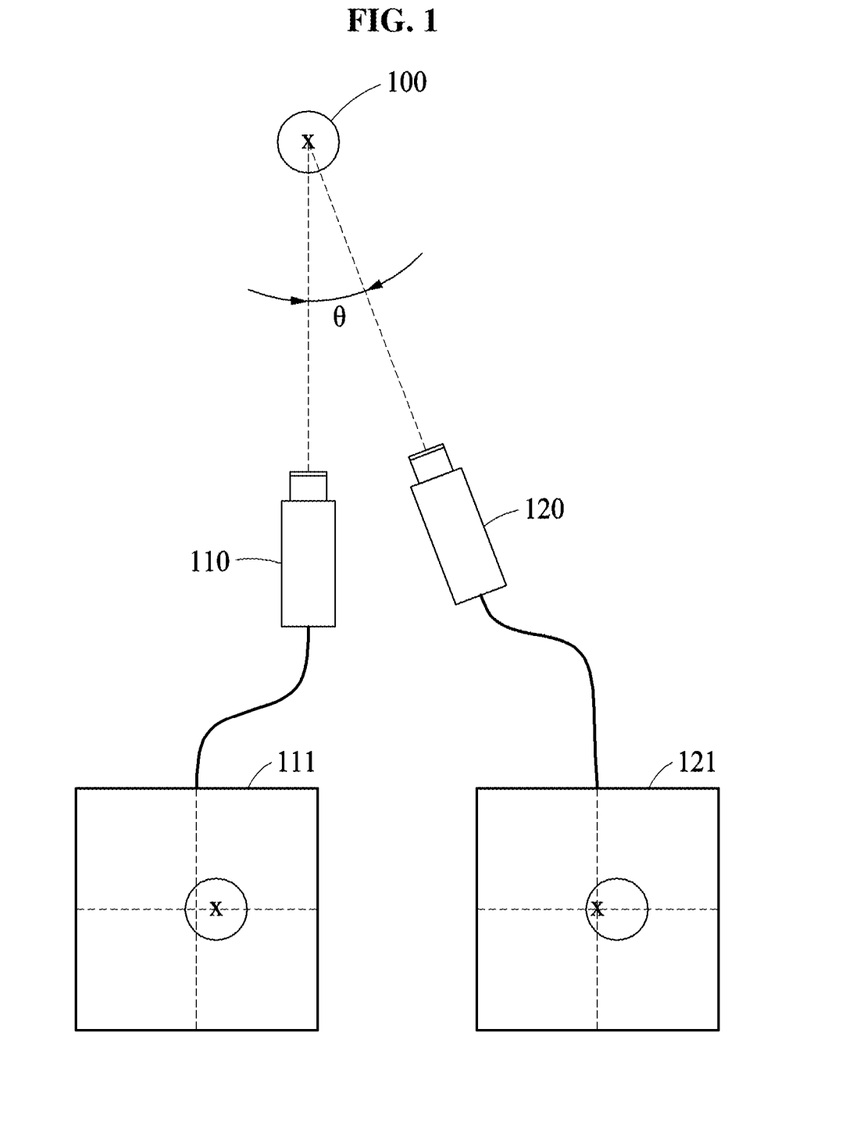
FIG. 1 is a diagram illustrating an example in which a binocular disparity image of an object is acquired by using a plurality of cameras with different viewpoints, according to an exemplary embodiment.

FIG. 1 is a diagram illustrating an example in which a binocular disparity image of an object is acquired by using a plurality of cameras with different viewpoints, according to an exemplary embodiment.

Each of camera 110 and camera 120 may include a DVS. The cameras 110 and 120 are arranged with a phase difference equal to an angle θ with respect to an object 100, and may be configured to capture the object 100.

For example, an x mark may be displayed on a center of the object 100 to facilitate an understanding of description. An image 111 acquired by the camera 110 and an image 121 acquired by the camera 120 may represent the object 100 in different directions. The x mark in the image 111 is displayed on the center of the object 100, and the x mark in the image 121 leans to a left side of the object 100, because the cameras 110 and 120 capture the object 100 with the phase difference of the angle θ.

To render a binocular disparity image, a disparity between the images 111 and 121 representing the same object, that is, the object 100, may need to be determined. In a DVS image, pixels may match based on an illumination variation and a disparity may be determined.

A portion including pixels with an illumination variation that is greater than or equal to a predetermined threshold in a DVS image may be referred to as an "event portion." In the DVS image, an event may typically occur around a frame or a boundary of the object 100. The event in the DVS image may indicate information about a structure of the object 100. In the DVS image, same objects may typically have similar structures. For example, an event corresponding to a left eye image and an event corresponding to a right eye image may have similar structures.

Since the DVS image has, for example, a problem in that a relatively large amount of noise may occur in an event portion, or a problem in that a distribution of events may not correspond to a number of events, predetermined processing may be required. An apparatus (hereinafter, referred to as a "disparity determination apparatus") for determining a disparity of a binocular disparity image according to an exemplary embodiment may quickly acquire features of pixels by obtaining a correlation between pixels and events based on a simple algorithm and by acquiring a distribution of events, and thus it is possible to reduce an amount of time for calculation.

Figure 2:
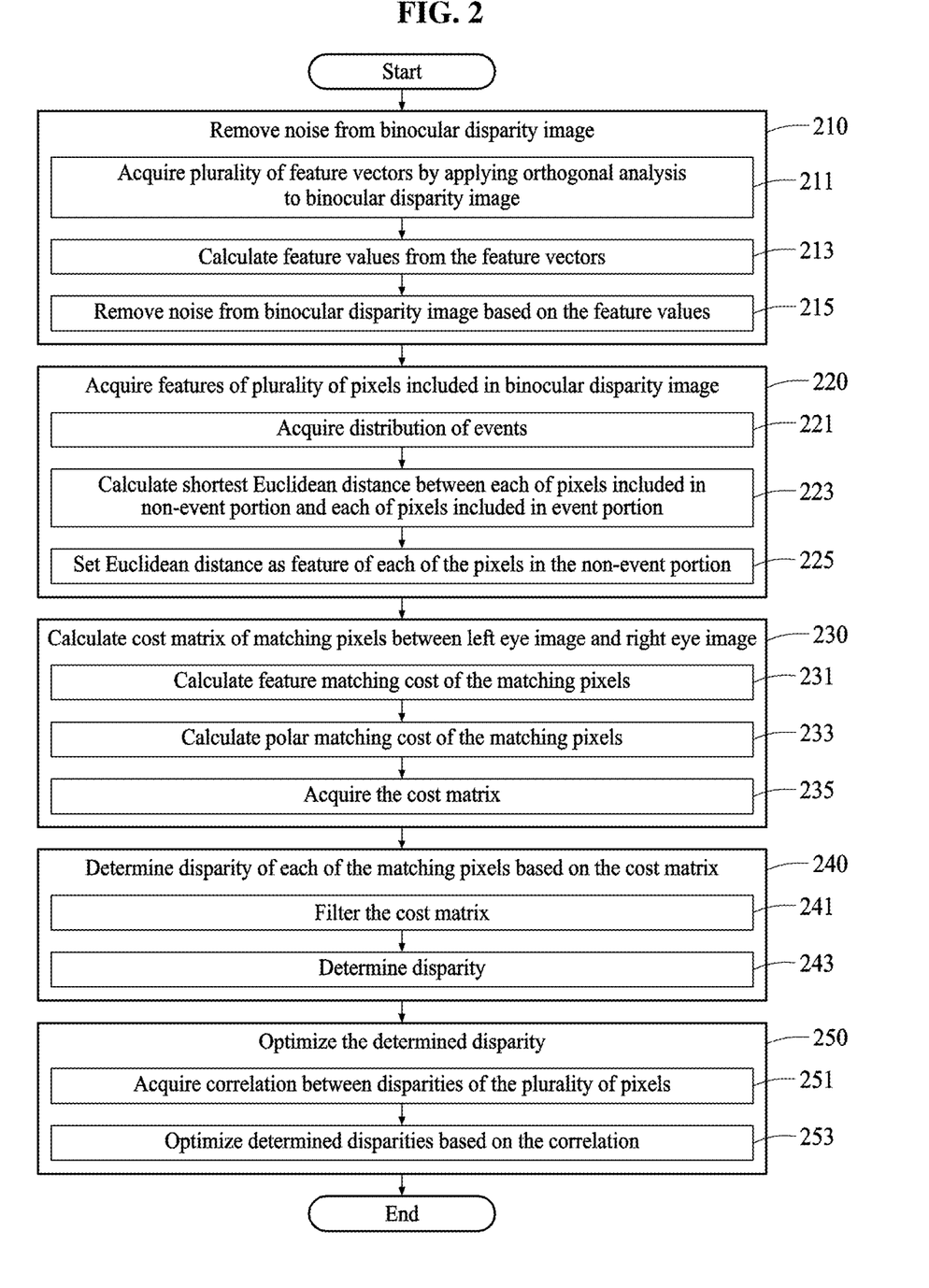
FIG. 2 is a flowchart illustrating a method for determining a disparity of a binocular disparity image, according to an exemplary embodiment.

FIG. 2 is a flowchart illustrating a method for determining a disparity of a binocular disparity image, according to an exemplary embodiment.

Referring to FIG. 2, in operation 210, a disparity determination apparatus according to an exemplary embodiment removes noise from a binocular disparity image. Operation 210 may be performed prior to operation 220. The binocular disparity image may include a left eye image and a right eye image.

In operation 211, the disparity determination apparatus acquires a plurality of feature vectors by applying an orthogonal analysis to the binocular disparity image. An event portion of a DVS image may be generated based on an illumination variation and may be typically distributed around a boundary of an object. In the DVS image, a portion in which events are sparsely distributed may be determined as noise, and a portion in which events are densely distributed may be determined as a source used to determine a disparity. A degree to which events are densely distributed may indicate a strong correlation between the events. A correlation between events may be acquired based on the orthogonal analysis.

In operation 213, the disparity determination apparatus calculates feature values from the plurality of feature vectors. A correlation between events may be represented by a feature vector. For example, a feature vector corresponding to a distribution of events that are strongly correlated may have a relatively high feature value, and a feature vector corresponding to a distribution of events that are weakly correlated may have a relatively low feature value. An event portion corresponding to a feature vector with a relatively low feature value may be determined as noise.

In operation 215, the disparity determination apparatus removes noise from the binocular disparity image based on the calculated feature values. The disparity determination apparatus may sort feature vectors in accordance with an order of feature values. In an example, the disparity determination apparatus may sort feature vectors in accordance with an ascending order of feature values, and may determine a preset number of feature vectors among the sorted feature vectors as noise. In another example, the disparity determination apparatus may sort feature vectors in accordance with a descending order of feature values, and may determine a preset number of feature vectors among the sorted feature vectors as noise. The disparity determination apparatus may combine feature vectors other than the feature vectors determined as the noise, in order to acquire a DVS image from which noise is removed.

Since the binocular disparity image includes the left eye image and the right eye image, a noise removal process may be performed on each of the left eye image and the right eye image.

In an example, feature vectors may be acquired by applying an orthogonal analysis to the left eye image, and feature values of the feature vectors may be removed. The feature vectors may be sorted in accordance with either of an ascending order or a descending order of the feature values. A preset number of feature vectors among the feature vectors sorted in accordance with the ascending order of the feature values may be determined as noise. The disparity determination apparatus may combine portions of the left eye image corresponding to feature vectors other than the feature vectors determined as the noise, in order to acquire a left eye image from which noise is removed.

In another example, feature vectors may be acquired by applying an orthogonal analysis to the right eye image, and feature values of the feature vectors may be removed. The feature vectors may be sorted in accordance with either of an ascending order or a descending order of the feature values. A preset number of feature vectors among the feature vectors sorted in accordance with the ascending order of the feature values may be determined as noise. The disparity determination apparatus may combine portions of the right eye image corresponding to feature vectors other than the feature vectors determined as the noise, in order to acquire a right eye image from which noise is removed.

Hereinbelow, the noise removal process will be described based on Equation 1 shown below.

$$I = I_0 + e = \Sigma_{i=1}^{r} \delta_i u_i v_i^H;\ I_0 = \Sigma_{i=1}^{k} \delta_i u_i v_i^H,\ k < r;\ e = \Sigma_{i=k+1}^{r} \delta_i u_i v_i^H;$$

[Equation 1]

Equation 1 represents an example of a noise removal formula. In Equation 1, I denotes an input binocular disparity image, $I_0$ denotes a binocular disparity image from which noise is removed, and e denotes a portion determined as noise in the binocular disparity image. k denotes a number of feature vectors sorted in accordance with a descending order of feature values. Also, r denotes a total number of feature vectors, $\delta_i$ denotes a feature value of an i-th feature vector, i denotes a feature vector number, $u_i$ and $v_i$ denote i-th feature vectors that are orthogonal to each other, and H denotes a substitution operation. The binocular disparity image $I_0$ may be acquired by removing the noise e from the binocular disparity image I.

In operation 220, the disparity determination apparatus acquires one or more features of a plurality of pixels included in the binocular disparity image based on a distribution of events in the binocular disparity image.

In operation 221, the disparity determination apparatus acquires the distribution of the events by classifying the plurality of pixels into respective pixels included in an event portion and respective pixels included in a non-event portion. Features of the pixels in the event portion may be initialized. For example, the features of the pixels in the event portion may be set to zero.

In operation 223, the disparity determination apparatus calculates a respective shortest Euclidean distance between each respective one of the pixels in the non-event portion and each respective one of the pixels in the event portion. The calculated shortest Euclidean distance may correspond to a feature of each respective one of the pixels in the non-event portion.

To calculate the respective shortest Euclidean distance, the disparity determination apparatus may acquire a plurality of parabolas of a function indicating a respective Euclidean distance between each respective one of the pixels in the non-event portion and each respective one of the pixels in the event portion. The disparity determination apparatus may acquire intersections between the acquired parabolas. The disparity determination apparatus may calculate the respective shortest Euclidean distance based on a lower envelope of the acquired intersections.

In operation 225, the disparity determination apparatus sets each of the respective Euclidean distances as a respective feature of each of the pixels in the non-event portion.

As described above, the disparity determination apparatus may substitute a calculation of a respective Euclidean distance for a calculation of a respective feature of each of pixels. A Euclidean distance may be calculated using a simple algorithm, and thus a calculation amount may be remarkably reduced.

Since the binocular disparity image includes the left eye image and the right eye image, an algorithm of calculating a respective Euclidean distance may be applied to each image.

In an example, the disparity determination apparatus may acquire a distribution of events by classifying a plurality of pixels included in the left eye image into respective pixels included in an event portion and respective pixels included in a non-event portion. Features of the pixels in the event portion may be initialized. For example, the features of the pixels in the event portion may be set to zero. The disparity determination apparatus may calculate a respective shortest Euclidean distance between each respective one of the pixels in the non-event portion and each respective one of the pixels in the event portion. The calculated respective shortest Euclidean distance may correspond to a respective feature of each of the pixels in the non-event portion of the left eye image.

In another example, the disparity determination apparatus may acquire a distribution of events by classifying a plurality of pixels included in the right eye image into respective pixels included in an event portion and respective pixels included in a non-event portion. Features of the pixels in the event portion may be initialized. For example, the features of the pixels in the event portion may be set to zero. The disparity determination apparatus may calculate a respective shortest Euclidean distance between each respective one of the pixels in the non-event portion and each respective one of the pixels in the event portion. The calculated respective shortest Euclidean distance may correspond to a respective feature of each of the pixels in the non-event portion of the right eye image.

Hereinafter, a process of obtaining a Euclidean distance will be described based on Equation 2 shown below.

$$D_n(x,y) = \min_{x'}((x-x')^2 + (y-y')^2 + f(x'+y')); \quad \text{[Equation 2]}$$

Equation 2 represents an example of a Euclidean distance transform formula. In Equation 2, $D_n(x,y)$ denotes a shortest Euclidean distance between a pixel (x, y) and an event (x',y'). f(x',y') denotes a feature value of the event (x',y'). Also, x and y denote an abscissa and an ordinate of the pixel (x, y), respectively, x' and y' denote an abscissa and an ordinate of the event (x', y'), respectively, and n denotes an identification number of a pixel.

Since a quadratic equation needs to be obtained for each pixel in order to directly obtain a Euclidean distance using Equation 2, a relatively long amount of time for calculation may be required. Essentially, Equation 2 may be regarded as a problem of finding a value of a parabola by using a plurality of pairs of the event (x', y') and the feature value f(x', y') as roots. The problem of finding a value of a parabola may be understood as a problem of obtaining an intersection between parabolas and obtaining an area within the intersection. A problem of obtaining a Euclidean distance may be changed to a problem of obtaining a value of a lower envelope of parabolas, and thus a problem of obtaining values of all pixels may be changed to a problem of obtaining a set of minimum parabola intersections.

Intersections between parabolas of a function indicating a Euclidean distance function may be relatively simply determined. For example, intersections between parabolas using a pair of $(x'_i, y'_i)$, $f(x'_i, y'_i)$ and a pair of $(x'_j, y'_j)$, $f(x'_j, y'_j)$ as roots may be quickly determined based on Equation 3. Here, i and j denote identification numbers of events. By using a simple algorithm, the disparity determination apparatus may reduce an amount of time for calculation and may obtain a Euclidean distance in real time.

$$S_{i,j} = \frac{(f(x'_i, y'_i) + (x'_i, y'_i)^2 - (f(x'_j, y'_j) + (x'_j, y'_j)^2}{2 * x'_i, y'_i - 2 * x'_j, y'_j} \quad \text{[Equation 3]}$$

In operation 230, the disparity determination apparatus calculates a cost matrix of matching respective pixels between the left eye image and the right eye image based on the features of the pixels. The cost matrix may include a feature matching cost and a polar matching cost.

In operation 231, the disparity determination apparatus calculates a respective feature matching cost of each matched pair of pixels based on the features of the pixels. For example, the feature matching cost may be derived using Equation 4 shown below.

$$CF_n(x,y,d) = \Sigma_{\omega \in W} D_n(x+d,y) - D_n(x,y), n=1, \ldots N; \quad \text{[Equation 4]}$$

In Equation 4, $CF_n(x, y, d)$ denotes a feature matching cost of a matched pair of pixels (x, y). W denotes a set of portions in the binocular disparity image, ω denotes identification numbers of the portions in the set W, d denotes a current disparity, N denotes a total number of pixels, and n denotes an identification number of a pixel.

In operation 233, the disparity determination apparatus calculates a respective polar matching cost of each matched pair of pixels based on a polarity of each of the pixels. For example, the polar matching cost may be derived using Equation 5 shown below.

$$CP(x,y,d) = \|E(x+d,y) - E(x,y)\|; \quad \text{[Equation 5]}$$

In Equation 5, CP(x, y, d) denotes a polar matching cost of a matched pair of pixels (x, y). E(x, y) denotes a polarity in a coordinate system of a pixel (x, y), and E(x+d, y) denotes a polarity in the coordinate system of a pixel (x+d, y).

In operation 235, the disparity determination apparatus acquires the cost matrix based on the feature matching cost and the polar matching cost. For example, the cost matrix may be derived using Equation 6 shown below.

$$C(x,y,d) = \alpha \Sigma_{n=1}^{N} CF_n(x,y,d) + (1-\alpha) \cdot CP(x,y,d); \quad \text{[Equation 6]}$$

In Equation 6, C(x, y, d) denotes a cost matrix of a matched pair of pixels (x, y), and a denotes a linear weight.

The disparity determination apparatus may match densely distributed pixels, instead of sparsely distributed events, by changing a process of matching events to a process of matching pixels. Thus, the disparity determination apparatus may be easily applicable to an application technology, for example, three-dimensional (3D) scene modeling or image rendering.

In operation 240, the disparity determination apparatus determines a respective disparity of each matched pair of pixels based on the cost matrix. For example, the disparity determination apparatus may use an algorithm, for example, a winner-take-all algorithm, as a greedy strategy to determine a respective disparity of each matched pair of pixels. The disparity determination apparatus may determine disparities of the left eye image and the right eye image using Equations 7 and 8 shown below.

$$d_l(x,y) = \min_k c^l(x,y,k); \quad \text{[Equation 7]}$$

In Equation 7, $c^l(x,y,k)$ denotes a cost matrix of the left eye image, and $d_l(x,y)$ denotes a disparity of a pixel (x, y) in the left eye image.

$$d_r(x,y) = \min_k c^r(x,y,k); \quad \text{[Equation 8]}$$

In Equation 8, $c^r(x, y, k)$ denotes a cost matrix of the right eye image, and $d_r(x, y)$ denotes a disparity of a pixel (x, y) in the right eye image.

In a non-event portion of a DVS image, an illumination variation may be less than a preset threshold. Similar illumination variations of pixels may indicate that viewpoints corresponding to the pixels are close to each other. Neighboring pixels included in the non-event portion may have similar cost values. Cost values of neighboring pixels in the non-event portion may be made to be similar by filtering the cost matrix acquired in operation 235 using a smoothing filtering scheme.

In operation 241, the disparity determination apparatus filters the cost matrix using the smoothing filtering scheme. The disparity determination apparatus may set a smoothing factor of the smoothing filtering scheme, and may filter the cost matrix based on the smoothing factor using the smoothing filtering scheme. In operation 243, the disparity determination apparatus determines a respective disparity of each matched pair of pixels based on the filtered cost matrix.

For example, the disparity determination apparatus may filter the cost matrix using the smoothing filtering scheme based on Equation 9 shown below.

$$C_s(p, d) = \frac{1}{K} \sum_{q \in N(p)} g(E_m(p, q)) C(q, d);$$ [Equation 9]

In Equation 9, $C_s(p, d)$ denotes the cost matrix filtered using the smoothing filtering scheme. p denotes a p-th pixel, d denotes a disparity corresponding to a pixel, and K denotes a number of pixels included in a portion that is within relatively close proximity to the p-th pixel p. Also, q denotes a pixel included in the portion in relatively close proximity to the p-th pixel p, and $g(E_m(p, q))$ denotes the smoothing factor. The smoothing factor $g(E_m(p, q))$ may be calculated using Equation 10 shown below.

$$g(E_m(p, q)) = \frac{1}{\sqrt{2\pi v}} \exp\left(-\frac{|E_m(P) - E_m(q)|}{2v}\right);$$ [Equation 10]

In Equation 10, $E_m(p)$ denotes a polarity of the p-th pixel p, and v denotes a constant value. The constant value v may be set in advance.

In operation 250, the disparity determination apparatus optimizes the determined disparity. The disparity determination apparatus may optimize respective disparities of non-robust pixels based on a correlation between the disparities and the features of the pixels. Operation 250 may be performed after operation 240.

In operation 251, the disparity determination apparatus acquires a correlation between the respective disparities of the plurality of pixels. The disparity determination apparatus may determine a respective feature of each of the pixels and may acquire a correlation between features of pixels in the left eye image and features of pixels in the right eye image. The disparity determination apparatus may acquire a respective robustness value with respect to each of the disparities by applying a cross-validation to the disparities. The disparity determination apparatus may acquire the correlation between the disparities based on the robustness values.

The disparity determination apparatus may obtain the features of the pixels in the binocular disparity image based on sparsely distributed events, and may acquire the correlation between the features of the pixels in the left eye image and the features of the pixels in the right eye image. Thus, the disparity determination apparatus may effectively increase a calculation speed by extracting a respective feature of each of the pixels using a relatively simple algorithm.

In operation 253, the disparity determination apparatus optimizes each of the determined disparities based on the correlation. The disparity determination apparatus may optimize the disparities based on a dense conditional random field. The disparity determination apparatus may determine a respective sub-pixel level disparity of each matched pair of pixels based on the dense conditional random field.

The disparity determination apparatus may acquire the dense conditional random field based on the robustness values and the correlation between the disparities. The disparity determination apparatus may acquire the dense conditional random field based on a disparity of a robust pixel and may represent a correlation between events. The disparity determination apparatus may effectively predict and optimize disparities of pixels that do not match based on the correlation between the events, may filter disparities of neighboring pixels using the smoothing filtering scheme, and may determine a respective sub-pixel level disparity.

The disparity determination apparatus may acquire respective depth values of the matched pairs of pixels based on the respective sub-pixel level disparity and a focal length of a camera that captures the binocular disparity image. The disparity determination apparatus may optimize disparities based on the depth values.

Since the binocular disparity image includes the left eye image and the right eye image, depth values of pixels may be applied to each image.

For example, depth values of pixels in a left eye DVS image may be acquired based on a focal length of a camera that captures the left eye DVS image, a distance between a left eye DVS camera and a right eye DVS camera, and a respective sub-pixel level disparity of each of the pixels in the left eye DVS image.

Similarly, depth values of pixels in a right eye DVS image may be acquired based on a focal length of a camera that captures the right eye DVS image, a distance between a right eye DVS camera and a left eye DVS camera, and a respective sub-pixel level disparity of each of the pixels in the right eye DVS image.

For example, the disparity determination apparatus may acquire a respective robustness value with respect to each of disparities by applying the cross-validation to the disparities using Equation 11 shown below.

$$d(x, y) = \begin{cases} d_1(x, y), & \text{if } d_1(x, y) = d_r(x + d_1, y) \\ -1, & \text{or} \end{cases}$$ [Equation 11]

The disparity determination apparatus may determine whether disparities $d_l(x, y)$ and $d_r(x+d_l, y)$ in Equation 11 are the same. When the disparities $d_l(x, y)$ and $d_r(x+d_l, y)$ are determined to be the same, a pixel (x, y) may be determined as a robust pixel. When the disparities $d_l(x, y)$ and $d_r(x+d_l, y)$ are determined to be different from each other, the pixel (x, y) may be determined as a non-robust pixel.

To predict a disparity of a non-robust pixel, the disparity determination apparatus may form a dense conditional random field E(D) by calculating a correlation between an arbitrary pixel and the other pixels, and may optimize a disparity of a pixel based on the dense conditional random field E(D). For example, the disparity determination apparatus may optimize a disparity using Equation 12 shown below.

$$E(D) = \sum_i \underbrace{\varphi_u(d_i)}_{unary} - \sum_i \sum_{j \neq i} \underbrace{\varphi_p(d_i, d_j)}_{relationships};$$ [Equation 12]

In Equation 12, $$\underbrace{\varphi_u(d_i)}_{unary},$$

as an energy formula, denotes a respective robustness value with respect to a respective disparity for each pixel. When the cross-validation is performed, a robust pixel may have a robustness value of N, and a non-robust pixel may have a robustness value of zero. For example, N may be "10." Also, $$\underbrace{\varphi_p(d_i, d_j)}_{relationships},$$

as an energy formula, denotes a correlation between disparities. For example, a correlation between disparities of pixels may be defined as shown in Equation 13 below.

$$\varphi_p(d_i, d_j) = \mu(d_i, d_j)\left(w_1 \exp\left(-\frac{|i-j|}{2\theta_\alpha^2} - \frac{|E_m(i) - E_m(j)|}{2\theta_\beta^2}\right) + w_2 \exp\left(-\frac{|i-j|}{2\theta_\gamma^2}\right)\right);$$ [Equation 13]

In Equation 13, when $d_i$ does not equal $d_j$, $\mu(d_i, d_j)$ may have a value of "1," and when $d_i$ equals $d_j$, $\mu(d_i, d_j)$ may have a value of "0." Also, i and j denote identification numbers of pixels, $w_1$ and $w_2$ denote weights, and $\theta_\alpha$, $\theta_\beta$ and $\theta_\gamma$ denote numerical parameters.

The disparity determination apparatus may obtain a sub-pixel level disparity by optimizing disparities of non-robust pixels based on a correlation between disparities of pixels. An optimization formula may be simplified by applying a gradient descent method. A simplified result may be a respective sub-pixel level disparity of each pixel.

For example, the disparity determination apparatus may calculate a respective depth value Z of each pixel based on a focus f of a camera and a distance B of the camera. The depth value Z may be obtained by "Z=f*B/d" in which d denotes a respective sub-pixel level disparity of a pixel.

The method of FIG. 2 has been described above based on Equations 1 through 13, however, the present disclosure is not limited to Equations 1 through 13.

Figure 3:
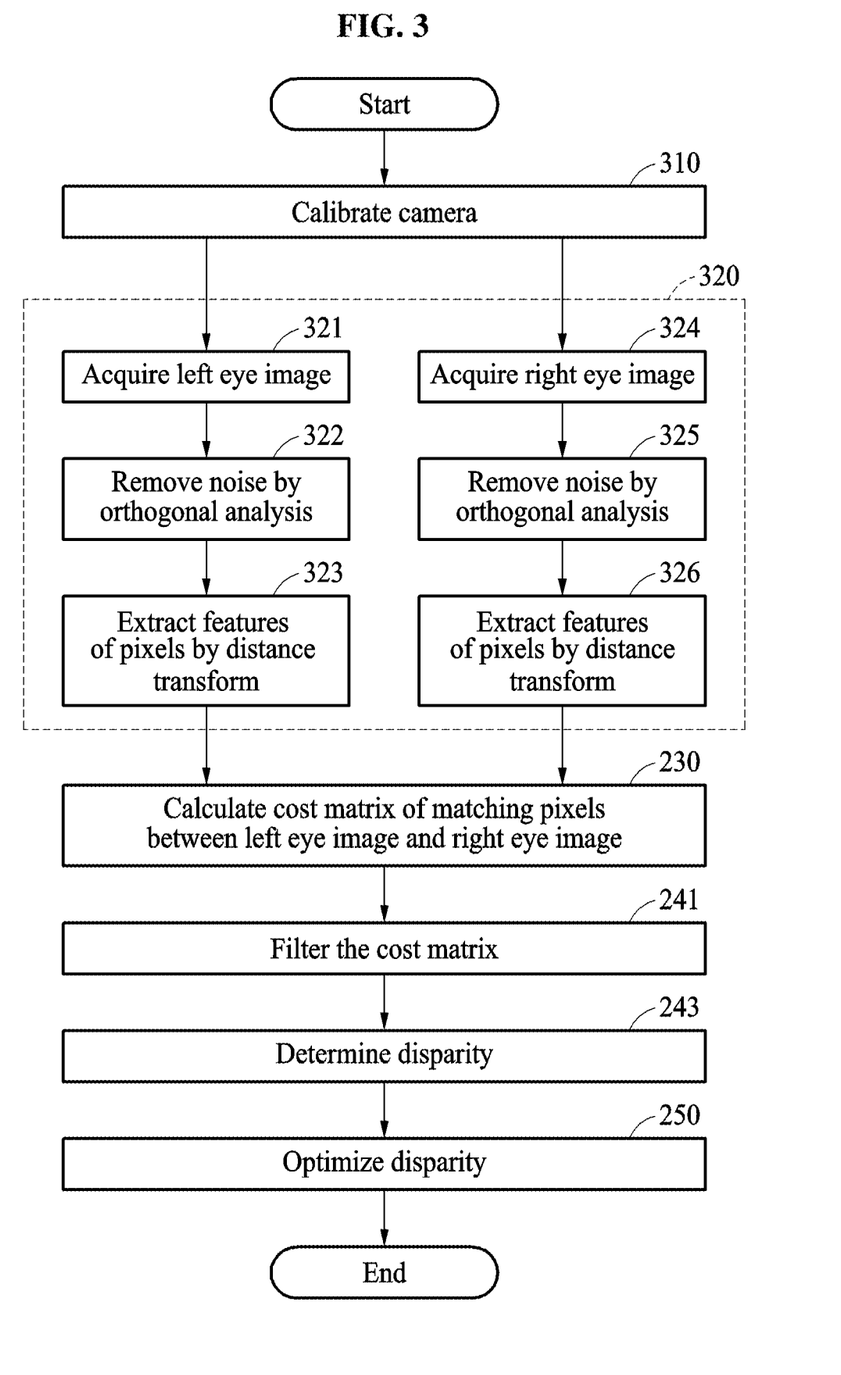
FIG. 3 is a flowchart illustrating an example of acquiring features of pixels from a left eye image and a right eye image, according to an exemplary embodiment.

FIG. 3 is a flowchart illustrating an example of acquiring features of pixels from a left eye image and a right eye image, according to an exemplary embodiment.

Referring to FIG. 3, in operation 310, a disparity determination apparatus according to an exemplary embodiment calibrates a DVS camera. Parameters, for example, a focal length of a left eye DVS camera, a focal length of a right eye DVS camera, or a distance between the left eye DVS camera and the right eye DVS camera, may be calibrated.

In operation 320, the disparity determination apparatus acquires one or more features of a plurality of pixels in a binocular disparity image based on a distribution of events in the binocular disparity image. Operation 320 may include a process of extracting features of pixels from the left eye image and include a process of extracting features of pixels from the right eye image. The processes may be simultaneously or sequentially performed.

The process of extracting features of pixels from the left eye image may include operation 321 of acquiring the left eye image from the binocular disparity image, operation 322 of removing a noise event by applying an orthogonal analysis to the left eye image, and operation 323 of extracting features of pixels by performing a Euclidean distance transform on the left eye image from which the noise event is removed.

The process of extracting features of pixels from the right eye image may include operation 324 of acquiring the right eye image from the binocular disparity image, operation 325 of removing a noise event by applying an orthogonal analysis to the right eye image, and operation 326 of extracting features of pixels by performing a Euclidean distance transform on the right eye image from which the noise event is removed.

In operation 230, the disparity determination apparatus calculates a cost matrix of matching respective pixels between the left eye image and the right eye image based on the features of the pixels.

The disparity determination apparatus determines a respective disparity of each matched pair of pixels based on the cost matrix. In operation 241, the disparity determination apparatus filters the cost matrix using a smoothing filtering scheme. In operation 243, the disparity determination apparatus determines a respective disparity of each matched pair of pixels based on the filtered cost matrix. In operation 250, the disparity determination apparatus optimizes each determined respective disparity.

Figure 4:
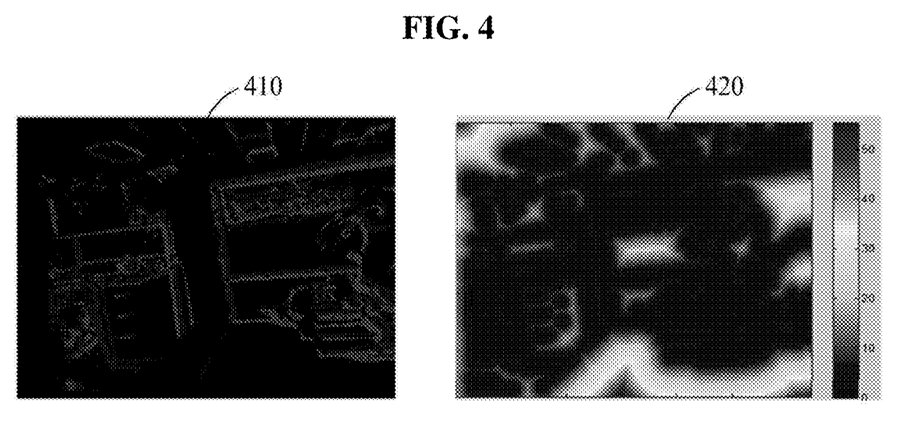
FIG. 4 illustrates a result obtained by visualizing features extracted by performance of a method for determining a disparity of a binocular disparity image, according to an exemplary embodiment.

FIG. 4 illustrates a result obtained by visualizing features extracted by performance of a method for determining a disparity of a binocular disparity image, according to an exemplary embodiment.

In FIG. 4, extracted pixel point features are visualized. An image 410 is an input DVS image, and may be, for example, a left eye image or a right eye image. An image 420 is obtained by visualizing features extracted from pixels of the image 410.

Figure 5:
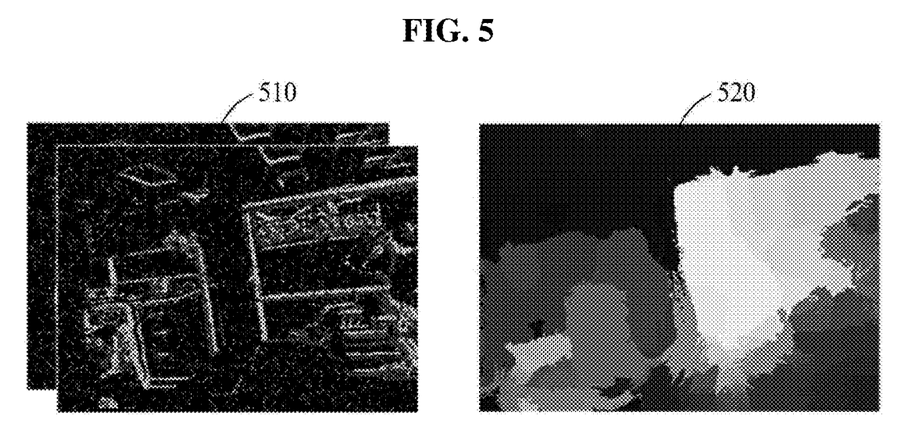
FIG. 5 illustrates a result obtained by visualizing disparities acquired by performance of a method for determining a disparity of a binocular disparity image, according to an exemplary embodiment.

FIG. 5 illustrates a result obtained by visualizing disparities acquired by performance of a method for determining a disparity of a binocular disparity image, according to an exemplary embodiment.

In FIG. 5, an image 510 is a binocular disparity image captured by a DVS camera. In the image 510, a portion in which an event occurs is represented by colors other than a black portion. An image 520 shows a respective disparity of each of pixels acquired from the image 510 based on a brightness. When the brightness increases in the image 510, each respective disparity may increase and a distance to a camera may decrease.

Figure 6:
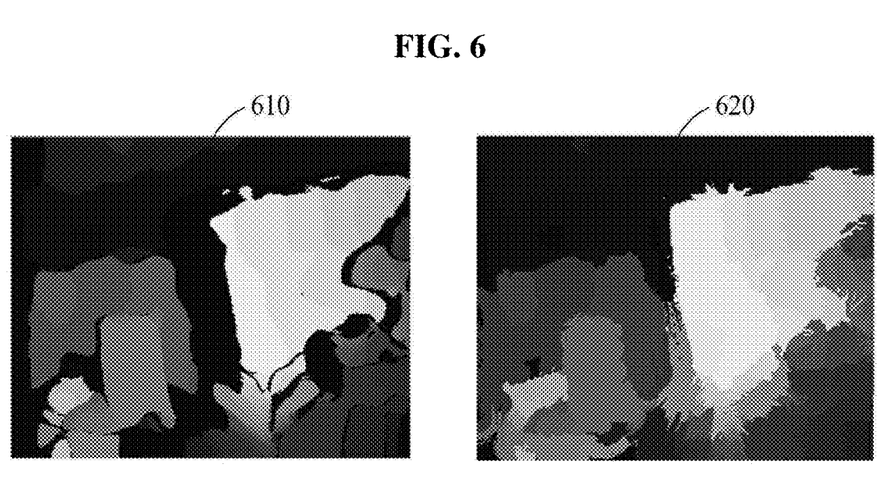
FIG. 6 illustrates a result obtained by visualizing disparities optimized by an optimization method, according to an exemplary embodiment.

FIG. 6 illustrates a result obtained by visualizing disparities optimized by an optimization method, according to an exemplary embodiment.

An image 610 is obtained by visualizing a disparity predicted before optimization, and an image 620 is obtained by visualizing a disparity predicted after optimization. In the image 610, a shape of an object captured by a DVS camera is not maintained and is relatively greatly changed, because disparities are not optimized. In the image 620, the shape of the object is maintained and is relatively slightly changed, because the disparities are optimized.

Figure 7:
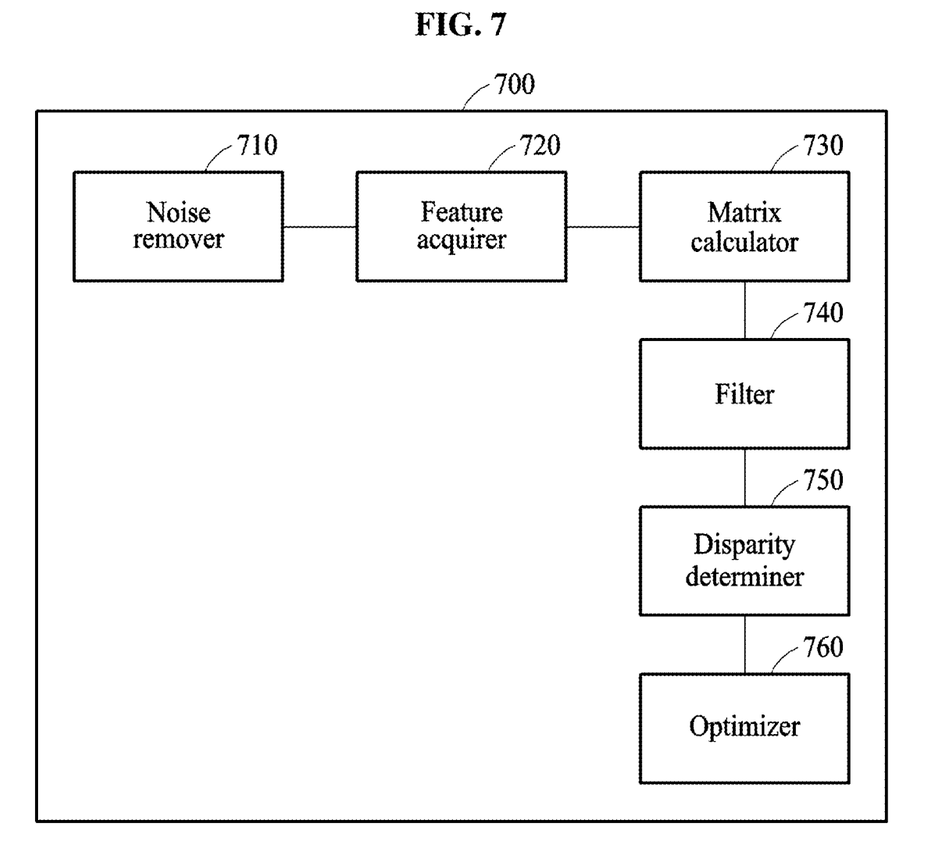
FIG. 7 is a block diagram illustrating a configuration of an apparatus for determining a disparity of a binocular disparity image, according to an exemplary embodiment.
Figure 8:
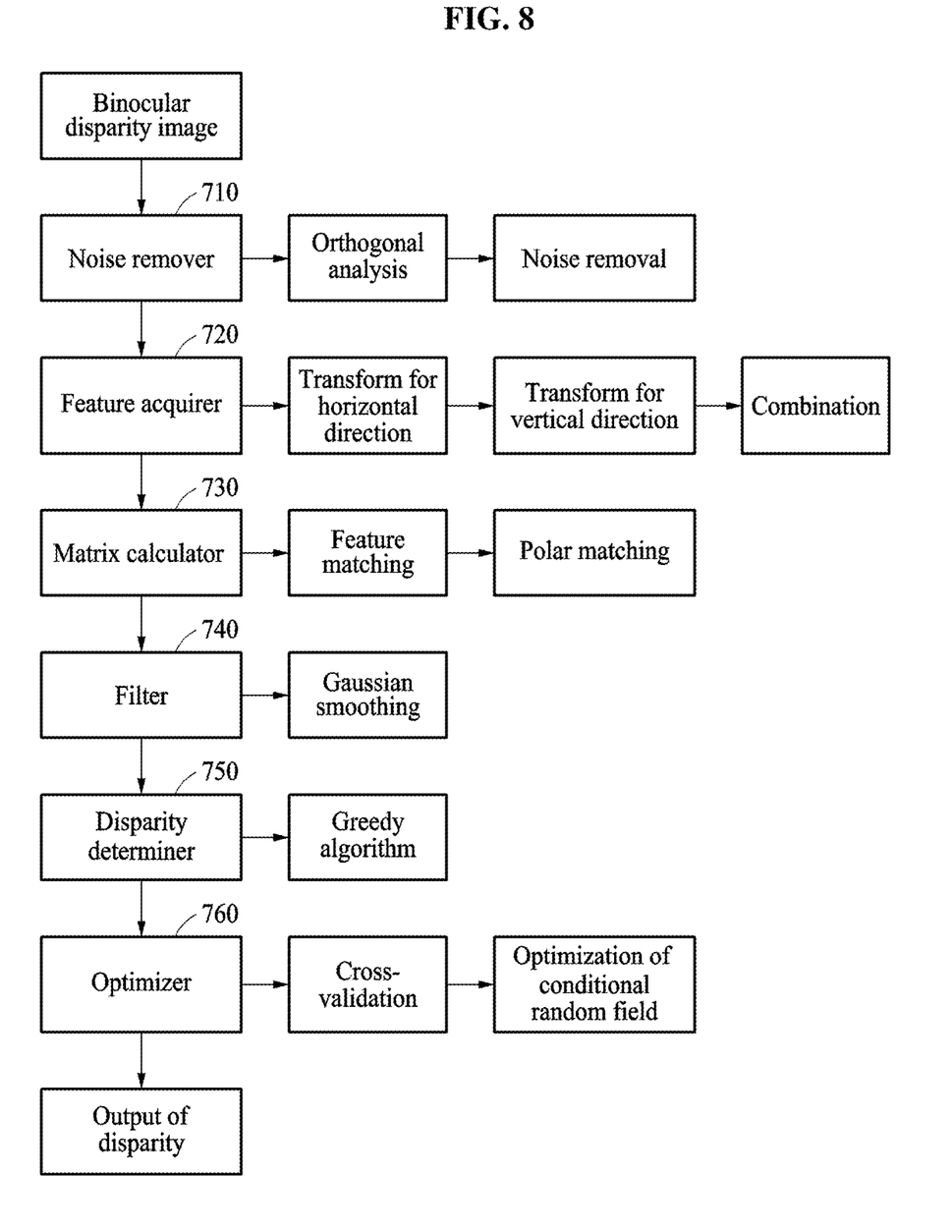
FIG. 8 is a flowchart of operations performed by components of the disparity determination apparatus of FIG. 7.

FIG. 7 is a block diagram illustrating a configuration of a disparity determination apparatus 700, according to an exemplary embodiment. FIG. 8 is a flowchart of operations performed by components of the disparity determination apparatus 700 of FIG. 7.

Referring to FIG. 7, the disparity determination apparatus 700 includes a feature acquirer 720, a matrix calculator 730 and a disparity determiner 750. The disparity determination apparatus 700 further includes a noise remover 710, a filter 740 and an optimizer 760.

The noise remover 710 may remove noise from an input binocular disparity image. The noise remover 710 may acquire a correlation between events based on a degree to which events are densely distributed, by using an orthogonal analysis. The noise remover 710 may represent the correlation as a feature vector and may determine an event portion corresponding to a relatively low feature value of a feature vector as noise, in order to remove noise from the binocular disparity image.

The feature acquirer 720 may acquire one or more features of a plurality of pixels included in the binocular disparity image based on a distribution of events in the binocular disparity image. Also, the feature acquirer 720 may acquire the features of the plurality of pixels in the binocular disparity image based on a distribution of events in the binocular disparity image from which noise is removed.

The feature acquirer 720 may acquire respective features of pixels based on a Euclidean distance transform. The feature acquirer 720 may apply a Euclidean distance transform to each of a horizontal direction and a vertical direction, and may acquire features of pixels by combining respective Euclidean distances acquired for each of the horizontal direction and the vertical direction.

The matrix calculator 730 may calculate a cost matrix of matching respective pixels between a left eye image and a right eye image based on the acquired features of the pixels. The matrix calculator 730 may obtain a respective feature matching cost of each matched pair of pixels based on feature matching. Also, the matrix calculator 730 may obtain a respective polar matching cost of each matched pair of pixels based on polar matching. The matrix calculator 730 may calculate the cost matrix based on the obtained feature matching costs and the obtained polar matching costs.

The filter 740 may filter the cost matrix. The filter 740 may set a smoothing factor of a smoothing filtering scheme, and may filter the cost matrix based on the smoothing factor using the smoothing filtering scheme. Also, the filter 740 may perform filtering using a Gaussian filtering scheme.

The disparity determiner 750 may determine a respective disparity of each matched pair of pixels based on the filtered cost matrix. For example, the disparity determiner 750 may use an algorithm, for example, a winner-take-all algorithm, as a greedy strategy to determine a respective disparity of each matched pair of pixels.

The optimizer 760 may optimize each determined respective disparity. The optimizer 760 may acquire a respective robustness value with respect to each respective disparity by applying a cross-validation to the disparities. To predict a disparity of a non-robust pixel, the optimizer 760 may form a dense conditional random field by calculating a correlation between an arbitrary pixel and the other pixels, and may optimize a disparity of a pixel based on the dense conditional random field.

The elements or components described herein may be implemented using hardware components, software components, or a combination thereof. For example, the hardware components may include microphones, amplifiers, bandpass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor (DSP), a microcomputer, a field programmable array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, a person having ordinary skill in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as compact disc-read-only memory (CD ROM) discs and digital versatile discs (DVDs); magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

While the present disclosure includes specific exemplary embodiments, it will be apparent to one of ordinary skill in the art that various changes in form and details may be made in these exemplary embodiments without departing from the spirit and scope of the claims and their equivalents. The exemplary embodiments described herein are to be considered in a descriptive sense only, and not for purposes of limitation. Descriptions of features or aspects in each exemplary embodiment are to be considered as being applicable to similar features or aspects in other exemplary embodiments. Suitable results may be achieved if the described techniques are performed in a different order, and/or if components in a described system, architecture, device, or circuit are combined in a different manner and/or replaced or supplemented by other components or their equivalents. Therefore, the scope of the present disclosure is defined not by the detailed description, but by the claims and their equivalents, and all variations within the scope of the claims and their equivalents are to be construed as being included in the present disclosure.

What is claimed is:

1. A method for determining a disparity of a binocular disparity image, the method comprising:
    acquiring a distribution of events by classifying a plurality of pixels in the binocular disparity image into pixels included in an event portion and pixels included in a non-event portion, the event portion comprising pixels with an illumination variation that is greater than or equal to a predetermined threshold and the non-event portion comprising pixels having an illumination variation that is less than the predetermined threshold;
    acquiring a respective feature of each of the plurality of pixels in the binocular disparity image based on the distribution of events
    calculating a cost matrix of matching respective pixels between a left eye image and a right eye image based on the acquired respective feature; and
    determining a respective disparity of each matched pair of pixels based on the calculated cost matrix,
    wherein the acquiring the respective feature comprises:
        acquiring a plurality of feature vectors each representing a correlation between events based on a degree of density by which the events are distributed;
        removing a noise from the binocular disparity image by removing an event portion corresponding to a feature vector having a relatively low feature value, the relatively low feature value representing a sparse distribution of events; and
        acquiring the respective feature from the binocular disparity image from which the noise is removed.

2. The method of claim 1, wherein the acquiring the respective feature comprises:
    calculating a respective shortest Euclidean distance between each respective one of the pixels in the non-event portion and each respective one of the pixels in the event portion; and
    for each respective one of the pixels in the non-event portion, setting the calculated respective shortest Euclidean distance as the respective feature.

3. The method of claim 2, wherein the calculating the respective shortest Euclidean distance comprises:
    acquiring a plurality of parabolas which correspond to a function indicating a respective Euclidean distance between each respective one of the pixels in the non-event portion and each respective one of the pixels in the event portion;
    acquiring intersections between the acquired parabolas; and
    calculating the respective shortest Euclidean distance based on a lower envelope of the acquired intersections.

4. The method of claim 1, wherein the calculating the cost matrix comprises:
    calculating a respective feature matching cost of each matched pair of pixels based on the respective feature of each of the pixels;
    calculating a respective polar matching cost of each matched pair of pixels based on a respective polarity of each of the pixels; and
    acquiring the cost matrix based on the calculated feature matching cost and the calculated polar matching cost for each matched pair of pixels.

5. The method of claim 1, wherein the determining the respective disparity comprises filtering the cost matrix.

6. The method of claim 1, wherein the acquiring the plurality of feature vectors comprises:
    acquiring the plurality of feature vectors by applying an orthogonal analysis to the binocular disparity image.

7. The method of claim 1, further comprising:
    optimizing each of the determined respective disparity.

8. The method of claim 7, wherein the optimizing each of the respective disparity comprises:
    acquiring a correlation between the respective disparity; and
    optimizing each of the respective disparity based on the acquired correlation.

9. The method of claim 8, wherein the acquiring the correlation comprises:
    acquiring a respective robustness value with respect to each of the respective disparity by applying a cross-validation to the respective disparity; and
    acquiring the correlation based on the acquired robustness values.

10. The method of claim 8, wherein the optimizing each respective disparity based on the correlation comprises:
    acquiring a dense conditional random field based on the acquired robustness values and the correlation; and
    optimizing each respective disparity based on the acquired dense conditional random field.

11. The method of claim 10, wherein the optimizing each respective disparity based on the dense conditional random field comprises:
    determining a respective sub-pixel level disparity of each matched pair of pixels based on the dense conditional random field; and
    acquiring a respective depth value of each matched pair of pixels based on the determined respective sub-pixel level disparity and a focal length of a camera that captures the binocular disparity image.

12. A non-transitory computer-readable storage medium storing instructions which, when executed by a computer, implement the method of claim 1.

13. An apparatus for determining a disparity of a binocular disparity image, the apparatus comprising:
    a feature acquirer configured to acquire a distribution of events by classifying a plurality of pixels in the binocular disparity image into pixels included in an event portion and pixels included in a non-event portion, the event portion comprising pixels with an illumination variation that is greater than or equal to a predetermined threshold and the non-event portion comprising pixels having an illumination variation that is less than the predetermined threshold, and acquire a respective feature of each of the plurality of pixels based on the distribution of
    a matrix calculator configured to calculate a cost matrix of matching respective pixels between a left eye image and a right eye image based on the acquired respective feature; and a disparity determiner configured to determine a respective disparity of each matched pair of pixels based on the calculated cost matrix, wherein the apparatus further comprises a noise remover configured to remove a noise from the binocular disparity image, by performing:

acquiring a plurality of feature vectors each representing a correlation between events based on a degree of density by which the events are distributed; and removing the noise from the binocular disparity image by removing an event portion corresponding to a feature vector having a relatively low feature value, the relatively low feature value representing a sparse distribution of events, wherein the feature acquirer is configured to acquire the respective feature from the binocular disparity image from which the noise is removed.

14. The apparatus of claim 13, further comprising:

an optimizer configured to optimize each determined respective disparity.

* * * * *